(12) United States Patent
Freeling-Wilkinson

(10) Patent No.: US 12,179,620 B2
(45) Date of Patent: *Dec. 31, 2024

(54) RETRACTABLE CHARGING STATION

(71) Applicant: URBAN ELECTRIC NETWORKS LTD, Hemel Hempstead (GB)

(72) Inventor: Olivier Freeling-Wilkinson, Cirencester (GB)

(73) Assignee: URBAN ELECTRIC NETWORKS LTD, Hemel Hempstead (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/591,642

(22) Filed: Feb. 29, 2024

(65) Prior Publication Data

US 2024/0198831 A1 Jun. 20, 2024

Related U.S. Application Data

(63) Continuation of application No. 17/584,113, filed on Jan. 25, 2022, now Pat. No. 11,945,324, and a
(Continued)

(30) Foreign Application Priority Data

Oct. 13, 2017 (GB) ...................................... 1716891

(51) Int. Cl.
*H02J 7/00* (2006.01)
*B60L 53/18* (2019.01)
(Continued)

(52) U.S. Cl.
CPC ............... *B60L 53/35* (2019.02); *B60L 53/18* (2019.02); *B60L 53/22* (2019.02); *B60L 53/305* (2019.02); *B60L 53/31* (2019.02)

(58) Field of Classification Search
CPC ........ B60L 53/35; B60L 53/22; B60L 53/305; B60L 53/31; B60L 53/18
(Continued)

(56) References Cited

U.S. PATENT DOCUMENTS 5,617,003 A * 4/1997 Odachi ................... B60L 53/35
320/108
5,821,731 A * 10/1998 Kuki ....................... B60L 53/14
320/108
(Continued)

FOREIGN PATENT DOCUMENTS

CH 688598 A5 11/1997
CN 105826981 A 8/2016
(Continued)

*Primary Examiner* — Alexis B Pacheco
(74) *Attorney, Agent, or Firm* — Armstrong Teasdale LLP

(57) ABSTRACT

A charging station for charging the battery of a vehicle includes: a base portion configured for mounting in a substructure; a charging portion having a charging outlet for connection to a vehicle; and a retraction mechanism for moving the charging portion between an extended position in which it extends out of the base portion and a retracted position; and a controller for controlling the retraction mechanism; the controller being configured to: determine whether a predetermined period of time has elapsed since the most recent charging from the charging outlet ceased; and cause the retraction mechanism to move the charging portion to the retracted position if the predetermined period of time is determined to have elapsed since the most recent electrical supply from the outlet.

20 Claims, 3 Drawing Sheets

Related U.S. Application Data continuation of application No. 16/754,029, filed as application No. PCT/GB2018/052968 on Oct. 15, 2018, now Pat. No. 11,305,662.

(51) Int. Cl.
  *B60L 53/22* (2019.01)
  *B60L 53/30* (2019.01)
  *B60L 53/31* (2019.01)
  *B60L 53/35* (2019.01)
  *H02J 7/14* (2006.01)

(58) Field of Classification Search
  USPC .................................................. 320/134, 109
  See application file for complete search history.

(56) References Cited

U.S. PATENT DOCUMENTS

| | | | | |
|---|---|---|---|---|
| 8,022,667 | B2* | 9/2011 | Anderson | H01M 10/46 |
| | | | | 320/109 |
| 8,890,475 | B1* | 11/2014 | Becker | B60L 53/66 |
| | | | | 320/109 |
| 9,701,209 | B2 | 7/2017 | Fontana | |
| 11,305,662 | B2 | 4/2022 | Freeling-Wilkinson | |
| 11,945,324 | B2* | 4/2024 | Freeling-Wilkinson | ................ |
| | | | | B60L 53/22 |
| 2010/0235006 | A1* | 9/2010 | Brown | B60L 53/126 |
| | | | | 700/286 |
| 2011/0050167 | A1 | 3/2011 | Kissel, Jr. | |
| 2011/0066515 | A1 | 3/2011 | Horvath et al. | |
| 2011/0145141 | A1 | 6/2011 | Blain | |
| 2012/0286730 | A1 | 11/2012 | Bonny | |
| 2013/0015816 | A1 | 1/2013 | Bianco | |
| 2013/0076902 | A1* | 3/2013 | Gao | B25J 9/042 |
| | | | | 348/148 |
| 2013/0257373 | A1 | 10/2013 | Mallon, IV et al. | |
| 2013/0307477 | A1 | 11/2013 | Reinschke | |
| 2014/0354229 | A1 | 12/2014 | Zhao et al. | |
| 2015/0028797 | A1 | 1/2015 | Miller et al. | |
| 2015/0042278 | A1 | 2/2015 | Leary | |
| 2015/0097529 | A1 | 4/2015 | Lacour | |
| 2015/0306974 | A1* | 10/2015 | Mardall | H01M 10/625 |
| | | | | 429/120 |
| 2016/0207406 | A1 | 7/2016 | Kauffmann | |
| 2016/0332525 | A1* | 11/2016 | Kufner | B60L 53/16 |
| 2018/0015836 | A1* | 1/2018 | Madon | B60L 53/18 |
| 2018/0056799 | A1* | 3/2018 | Namou | B60L 58/20 |
| 2018/0226750 | A1 | 8/2018 | Widegren | |
| 2019/0092184 | A1 | 3/2019 | Sussman et al. | |
| 2021/0053456 | A1 | 2/2021 | Freeling-Wilkinson | |

FOREIGN PATENT DOCUMENTS

| | | |
|---|---|---|
| CN | 206358009 U | 7/2017 |
| CN | 107696912 A | 2/2018 |
| CN | 107791877 A | 3/2018 |
| CN | 110509802 A | 11/2019 |
| CN | 111098739 A | 5/2020 |
| CN | 111993929 A | 11/2020 |
| DE | 102011105421 A1 | 12/2012 |
| EP | 0788212 A2 | 8/1997 |
| EP | 2039557 A1 | 3/2009 |
| GB | 2471879 A | 1/2011 |
| GB | 2541654 A | 3/2017 |
| JP | 3030065 U | 10/1996 |
| JP | 2009278711 A | 11/2009 |
| JP | 2011160615 A | 8/2011 |
| JP | 2012100448 A | 5/2012 |
| JP | 2015116010 A | 6/2015 |
| WO | 9810144 A1 | 3/1998 |
| WO | 2010051477 A2 | 5/2010 |
| WO | 2015128498 A1 | 9/2015 |
| WO | 2017037021 A1 | 3/2017 |
| WO | 2019073271 A1 | 4/2019 |
| WO | 2020252671 A1 | 12/2020 |

* cited by examiner

RETRACTABLE CHARGING STATION

CROSS-REFERENCE TO RELATED APPLICATIONS

This application is a continuation of U.S. patent application Ser. No. 17/584,113 filed Jan. 25, 2022, which is a continuation of U.S. patent application Ser. No. 16/754,029 filed Apr. 6, 2020 (now U.S. Pat. No. 11,305,662), which is a U.S. National Phase Application of PCT/GB2018/052968, filed Oct. 15, 2018, which claims the benefit of priority to GB Application No. 1716891.5, filed Oct. 13, 2017, the contents of which are hereby expressly incorporated by reference in their entirety.

BACKGROUND OF THE INVENTION

This invention relates to a retractable charging station for charging the battery of a vehicle.

BRIEF DESCRIPTION OF THE PRIOR ART

Electric vehicles include purely electric-powered vehicles, whose motive power is provided solely by electricity, and hybrid vehicles, whose motive power is provided by a combination of electricity and another source such as an internal combustion engine. Electric vehicles are becoming increasingly popular. Most electric vehicles rely on their energy store (e.g. a battery) being charged from a charging station when the vehicle is stopped. Charging stations can be provided at service areas and in vehicle owners' garages. This may be sufficient in regions of the world where it is normal to park in a garage. However, in some areas it is normal to park on the street.

Vehicle-to-grid (V2G) systems, in which electric vehicles communicate with the power grid in order to return electricity to the grid or throttle their charging rate, provide a flexible mechanism for meeting the power requirements of the grid at peak usage times as well as enabling the vehicle owner to recharge their vehicle at off-peak times at cheaper rates. Improper control/use of and damage to charging stations may negatively affect both the vehicle owner and electrical grid operators.

If an owner of an electric vehicle parks on the street outside his house, it would be possible for him to run an electrical cable from his house to the vehicle in order to charge the vehicle. However, that cable might run across a pavement between the house and the street, which would present a hazard to passers-by.

There is a need for an improved mechanism for on-street vehicle charging.

SUMMARY OF THE INVENTION

According to the present invention there is provided a charging station for charging the battery of a vehicle, comprising a base portion configured for mounting in a substructure, a charging portion having a charging outlet for connection to a vehicle and a retraction mechanism for moving the charging portion between an extended position in which it extends out of the base portion and a retracted position and a controller for controlling the retraction mechanism, the controller being configured to determine whether a predetermined period of time has elapsed since the most recent charging from the charging outlet ceased and cause the retraction mechanism to move the charging portion to the retracted position if the predetermined period of time is determined to have elapsed since the most recent electrical supply from the outlet.

The controller may be further configured to adjust the predetermined period of time in dependence on the prior behaviour of at least one user.

The charging station may further comprise a user interface configured to receive an input from a user and the controller is further configured to adjust the predetermined period of time in dependence on the received input.

The charging station may further comprise a receiving apparatus for receiving wireless signals and the controller is further configured to adjust the predetermined period of time in dependence on the received wireless signals.

The receiving apparatus may be configured to receive wireless signals via at least one of Bluetooth®, Wi-Fi, NFC (near-field communication) or RFID.

The controller may be further configured to adjust the predetermined period of time in dependence on a measure of user proximity derived from the received wireless signal.

The controller may be further configured to determine the charge of a connected vehicle.

The controller may be further configured to adjust the predetermined period of time in dependence on the most recent determined charge of a connected vehicle.

The controller may be further configured to adjust the predetermined period of time in dependence on the time of day.

The controller may be further configured to adjust the predetermined period of time in dependence on signals received from nearby charging stations.

The controller may be further configured to adjust the predetermined period of time in dependence on the weather.

The controller may be further configured to determine if the movement of the charging portion or retraction mechanism is obstructed, and to prevent movement if an obstruction is detected.

The charging portion may be attached to the charging outlet via a charging cable. The controller may be further configured to cause the charging portion to reel in the charging cable upon before causing the retraction mechanism to move the charging portion to the retracted position.

The charging portion may comprise a telescopic column.

The charging outlet may comprise at least one of an electrical socket and a wireless electric charging apparatus.

The charging station may further comprise a data input cable, and wherein the controller may extend or retract the charging portion in dependence on data received via the data input cable.

The charging portion may be configured to charge the battery of an electric road vehicle.

The retraction mechanism may be configured to move the charging portion substantially vertically between an extended position and a retracted position.

The base portion may be configured for mounting in a substructure comprising a roadway or walkway.

The controller may be further configured to detect a surge in power supplied to the charging station. The controller may be further configured to terminate charging upon detecting a surge in power. The controller may be further configured to cause the retracting mechanism to retract the charging portion when a power surge is detected.

The controller may determine that charging has ceased by determining that a vehicle has been electrically disconnected.

The controller may determine that charging has ceased by determining that the battery of a connected vehicle is fully charged.

The base portion may further comprise an anchoring portion for securing the base portion to the substructure.

The distal end of the charging portion may be substantially flush with one face of the base portion when the charging portion is retracted.

The distal end of the charging portion may be substantially flush with a surface of the substructure when the charging portion is retracted.

One face of the base portion may be substantially flush with a surface of the substructure when the charging portion is retracted.

The base and charging portions may form a seal for resisting entry of fluids into the base portion when the charging portion is retracted.

DESCRIPTION OF THE DRAWINGS

The present invention will now be described by way of example with reference to the accompanying drawings. In the drawings.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
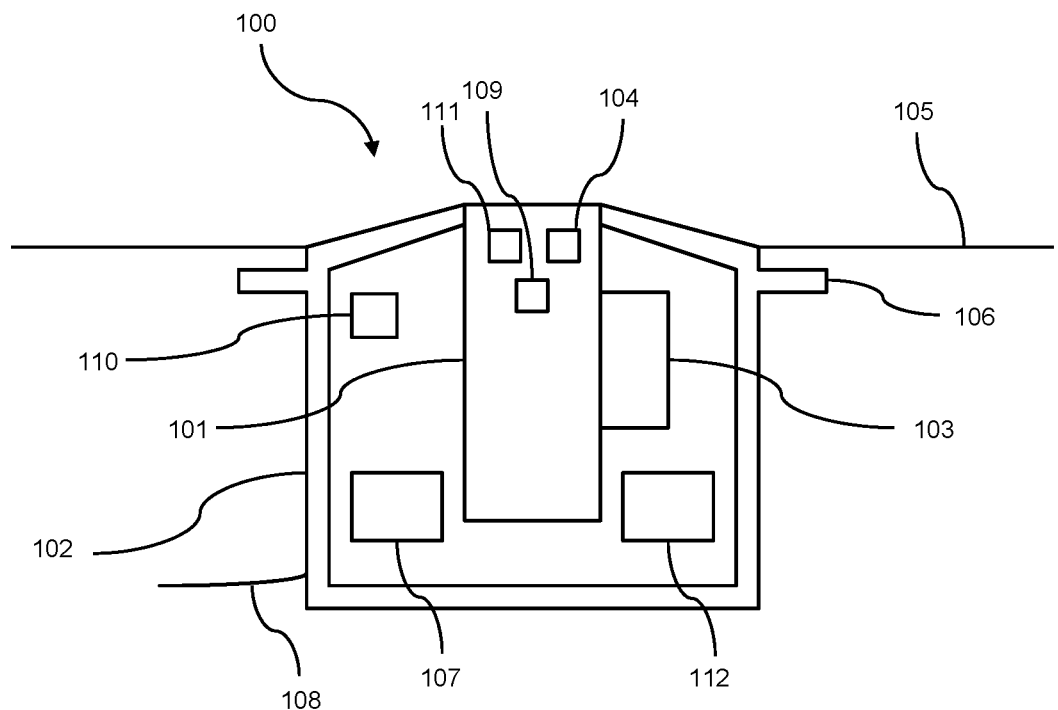
FIG. 1 is a schematic diagram of the charging station in accordance with the present invention.
Figure 4:
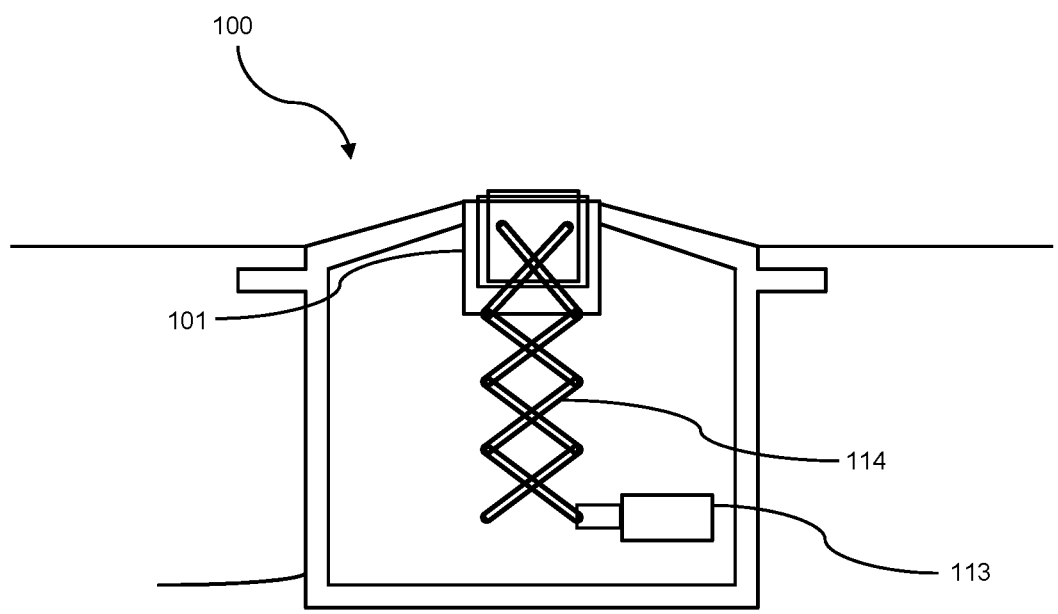
FIG. 4 shows the charging station with a telescopic, scissor jack driven arrangement when it is in its retracted state.
Figure 5:
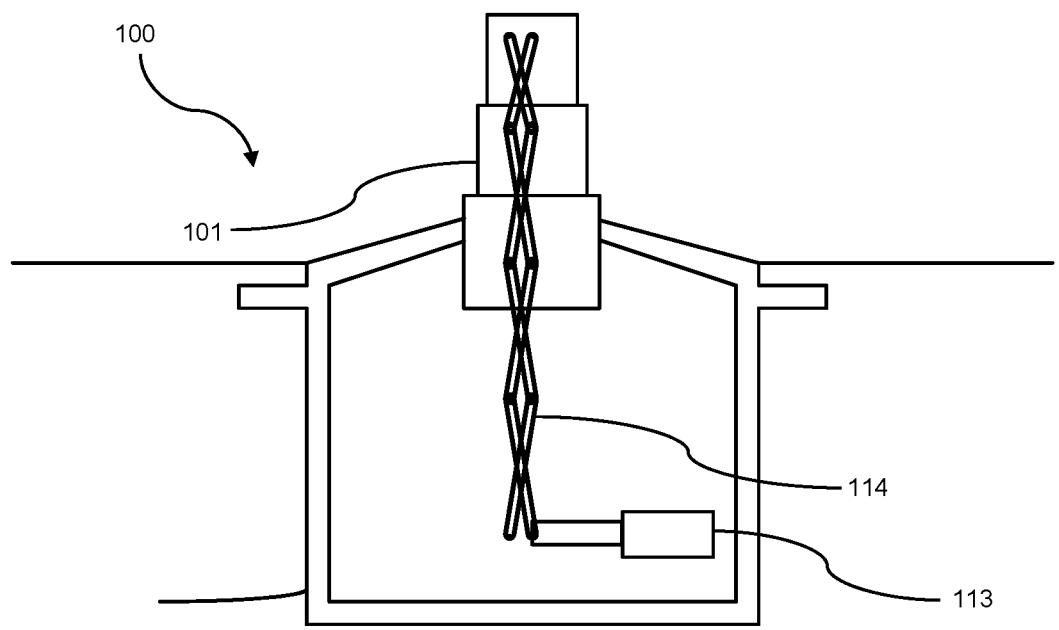
FIG. 5 shows the charging station with a telescopic, scissor jack driven arrangement when it is in its extended state.

FIG. 1 is a schematic diagram of a charging station 100. The charging station comprises a charging portion 101 with a charging outlet 104 for connection to a vehicle 300. The charging portion is a column, post or other structure which can carry the charging outlet. The charging outlet may be any suitable structure for transferring electrical charge to a vehicle, for example, one or more electrical sockets, plugs or wireless charging systems. The charging outlet may be situated directly on the charging portion or may connect to the charging portion by an electrical cable. If a charging cable is used, the charging portion may contain a receptacle or for storing the retracted charging cable or a dock into which the charging outlet can be docked when it is not in use. The charging portion may comprise a drive mechanism for mechanically withdrawing the charging cable when it is not in use. The drive mechanism may withdraw the charging cable into the receptacle, or so that a charging outlet on the distal end of the cable is made flush with the exterior of the charging portion. The charging station 100 may receive its electricity wirelessly via a wireless receiving apparatus 107 and/or by an underground/embedded cable 108. The charging station may generally be referred to as a bollard, point, post, pillar, pole, column etc. The charging portion need not prismatic and may be any arbitrary shape. The charging portion may be monolithic or it may be segmented to allow it to collapse telescopically. A telescopic charging portion, like that shown in FIGS. 4 and 5, allows the system to remain compact to ensure simple installation in many different locations without requiring deep holes to be dug, whilst ensuring the charging outlet meets electrical and mobility compliance standards. Individual telescopic segments of the charging portion may arranged along the length of the fully extended telescopic charging portion in either a large-to-small order (as shown in FIG. 5) or in the reversed, small-to-large order (not shown). A telescopic portion may comprise two or more individual telescopic segments, for example there may be 2, 3 (as shown in FIGS. 4 and 5), 4, 5 or 6 segments, The individual telescopic segments may not be equal in length and may get longer or shorter the further they are along the length of the charging portion. The individual telescopic segments may be irregularly sized.

The vehicle to be charged may be any of type (provided it has a battery, by which is meant any electrical storage device), for example the vehicle may be fully electric, an electric/internal combustion hybrid, or fully internal combustion driven. Though the preferred embodiment relates to the charging of a road vehicle, the system could equally be used for charging the battery of any other type of vehicle, for example aircraft, boats, trains, electric wheelchairs and mobility scooters. Conveniently the vehicle uses electrical energy to provide its motive power. The vehicle may engage in Vehicle-to-grid (V2G) activities by communicating with the power grid in order to return/sell electricity to the grid or throttle its charging rate.

Figure 2:
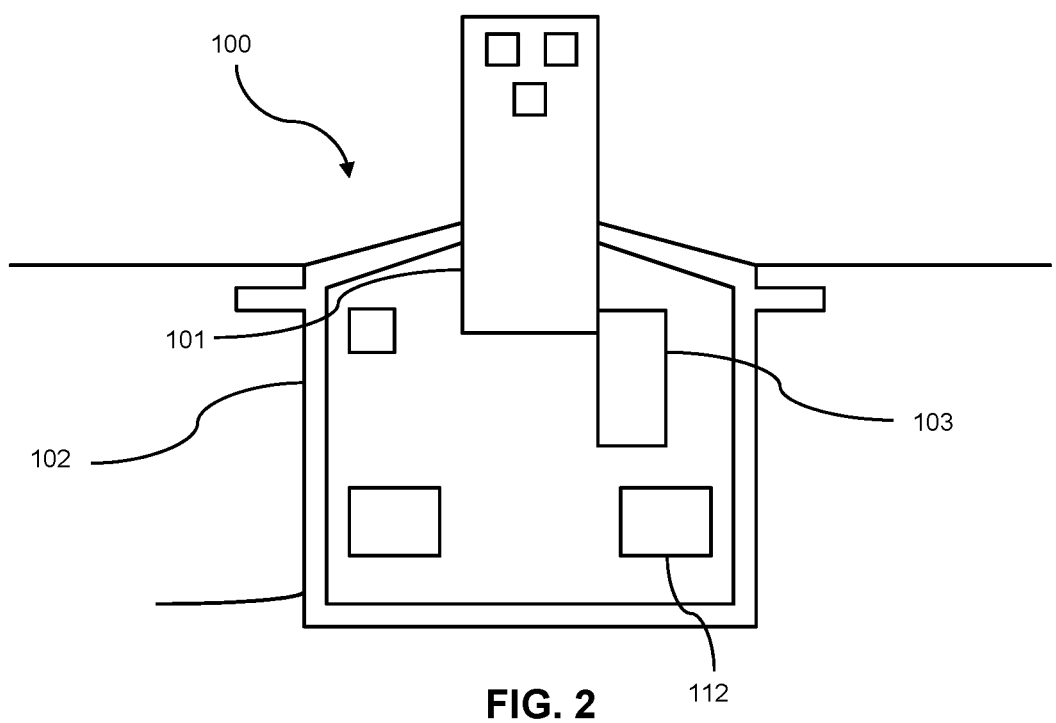
FIG. 2 shows the charging station when it is in its extended state.
Figure 3:
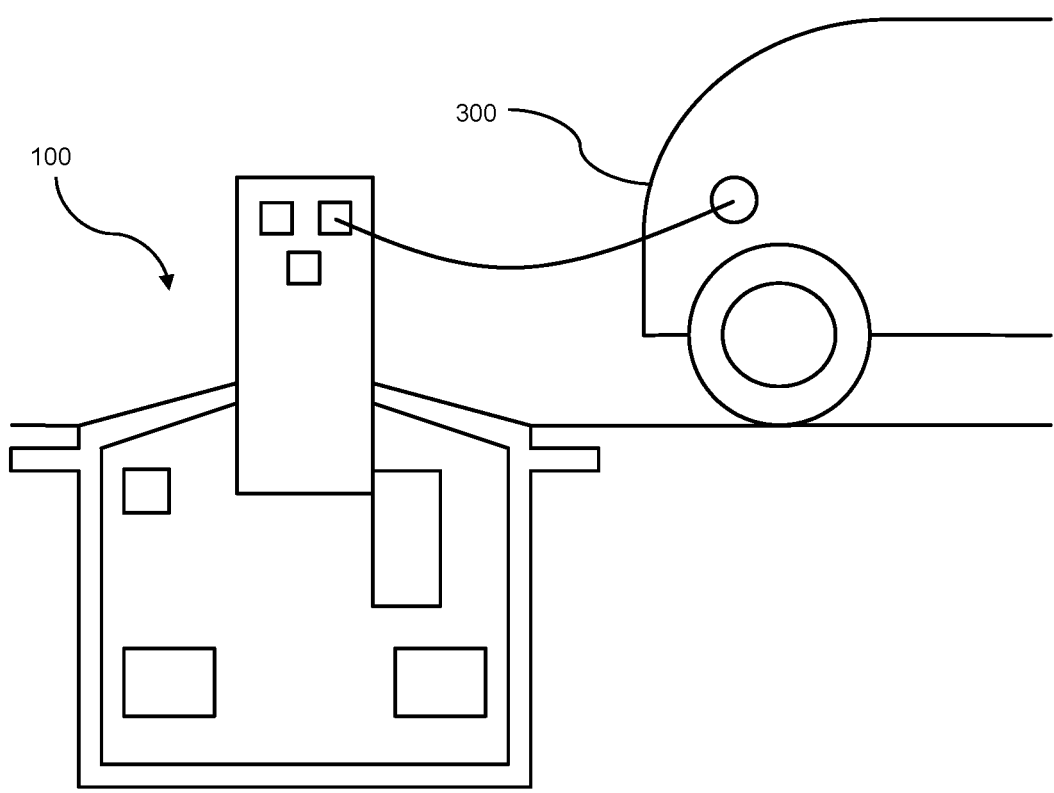
FIG. 3 shows the charging station when it is in use, charging an electric vehicle.

The charging system also comprises a base portion 102 which defines a recess into which the charging portion can be retracted. Preferably the base portion and the charging portion are arranged so that the charging portion can be retracted in a vertical or substantially vertical direction into the base portion. Then the base portion can conveniently be installed in horizontal or substantially horizontal surface such as a road or pavement (sidewalk). Alternatively, the base portion may be arranged so that the charging portion retracts in another direction. For example, the base portion could be installed flush with a vertical wall and the charging portion could retract horizontally. When the charging portion is in its retracted state, the charging and base portions may form a seal (for example, a resilient seal e.g. a rubber seal) between each other, so as to resist fluids from entering a recess into which the charging portion has been retracted. This may help to prevent water leakage from damaging components. The charging system is configured to be embedded in a substructure 105, so as to allow the system to not substantially protrude from the surface when in a retracted state. Though the base portion is preferably installed flush with the substructure, it may protrude from a surface the surface of the substructure as space and other installation requirements dictate, as shown in FIGS. 1-3 where the base portion protrudes slightly from the surface of the substructure. The substructure may be any kind of suitable surface or medium such as a road/runway surface, earth, gravel, a pavement or walkway, a wall or the floor of a garage. The system may also comprise an anchoring portion 106, for securing the system to the substructure. This anchoring portion may utilise any suitable known method of fixing, such as using one or more of concrete foundations, steel rods, bolts, welding, riveting, cementing, glueing, clipping. Though the anchoring portion is shown near to surface in FIG. 1, it may be located anywhere around the system. The base portion 102 and the charging portion should be strong enough to support at least 250 kg, and may be made of, for example, steel or plastic.

The base portion and/or the distal end of the charging portion may comprise a load sensor to detect a load.

The charging system further comprises a retraction mechanism 103. The retraction mechanism may comprise any suitable apparatus for moving the charging portion relative to the base portion. Examples include hydraulic, pneumatic, thermal or magnetic actuators or a mechanical system which may utilise one or more of scissor mechanisms, gears, rails, pulleys and/or chains. An example comprising an actuator 113 acting on a scissor mechanism 114 in a 'scissor jack" arrangement is shown in FIGS. 4 and 5. In the telescopic arrangement shown, one end of the scissor mechanism is moveably attached to the base portion 102 and/or substructure 105 with the other end being moveably attached to the portion 101, whilst one end of actuator 113 is attached to the base portion 102 and/or substructure with the other end being attached to scissor mechanism 114. It will be evident that this arrangement could be applied to examples where the charging portion is not telescopic.

The retraction mechanism may be used to cause the charging portion to move between an extended position and a retracted position as appropriate, for example, the charging portion may be extended whilst charging is taking place, but should ideally be retracted when no charging is occurring. In the preferred embodiment, the retraction mechanism will move the charging portion substantially vertically from a substantially concealed, retracted position to a raised, extended position. The system in its extended state is shown in FIGS. 2 and 5, wherein the charging portion extends out of the base portion, and in its retracted state in FIGS. 3 and 4, wherein the upper part of the charging portion is substantially within the upper part of the base portion.

The retraction mechanism 103 may be partially (as shown in FIGS. 4 and 5) or wholly within the charging portion. The retraction mechanism may alternatively be wholly outside of the charging portion and simply act on the exterior of the charging portion.

The ability to retract can help prevent the charging portion from being an obstacle that may inconvenience or harm other users of the area, for example, when retracted pedestrians will not be able to walk into it and cars will not be able to crash into it. The ability to stow the charging portion in its retracted state also helps to maintain the aesthetic appeal of the environment where the system is installed, as it will have a lower profile when the charging portion is stowed.

More than one retraction mechanisms may be used, which may be the same type of mechanism or different mechanisms. This can help to ensure that the forces acting on the charging portion during extension are applied as desired (e.g. symmetrically) and also reduces the load on each individual retraction mechanism, reducing wear and the need for regular maintenance.

A controller 112 is used to control the retraction mechanism. Controller 112 may be located in the base portion 102 or wholly or partially within the charging portion 101. The controller is configured to control the retraction mechanism to drive the charging portion from its retracted state to its extended state or from its extended state to its retracted state. These actions may occur in response to various stimuli. These will be discussed in more detail below, but some examples are as follows. The controller may be configured to control the retraction mechanism to drive the charging portion from its retracted state to its extended state in response to any one or more of the following factors, in any combination:

A physical user input device associated with the charging station being actuated by a user. The physical user input device could be a push button or touch screen. It could be on the charging station itself or on a nearby placard or operation station.

A signal being received by the controller that indicates that a user has transmitted a demand for use of the charging station. For example, a user could indicate using a mobile phone application or an in-car system that he wants to use the charging station. The application could signal that desire to a server and the server could signal that desire to the charging station over a wired or wireless network to which the controller is connected.

A vehicle that can be charged being detected to be near the charging station. An electrical vehicle may automatically communicate with the charging station to request charging when it is required.

The controller may be configured to control the retraction mechanism to drive the charging portion from its extended state to its retracted state in response to any one or more of the following factors, in any combination:

A physical user input device associated with the charging station being actuated by a user. The physical user input device could be a push button or touch screen. It could be on the charging station itself or on a nearby placard or operation station.

A signal being received by the controller that indicates that a user no longer wants to use the charging station. For example, a user could indicate using a mobile phone application or an in-car system that he no longer wants to use the charging station. The application could signal that intent to a server and the server could signal that intent to the charging station over a wired or wireless network to which the controller is connected.

A vehicle that can be charged being detected to be no longer near the charging station. An electrical vehicle may automatically communicate with the charging station to relinquish demand for charging when it is required.

A predetermined amount of time (which may be zero) having elapsed since charging by means of charging station ceased.

The charging outlet being docked with the charging portion.

The controller may determine that charging from the charging outlet has ceased, for example by detecting that no current is flowing from the charging outlet or by determining that the battery of a connected vehicle is fully charged. The controller may determine if the movement of the charging portion is obstructed and to prevent the operation of the retraction mechanism if an obstruction is detected. In the case that the charging portion comprises a cable system, the controller may cause the cable to be retracted before the charging portion is retracted. It may block retraction of the charging portion if the cable cannot be fully retracted. The controller may cause the charging cable to be reeled in before the charging portion is moved to the retracted position. The controller may prevent the retraction mechanism from extending if the load sensor detects a load that exceeds a predetermined threshold to, for example, prevent damage from attempting to extend the charging portion when a person or vehicle is blocking it.

The charging system may also comprise one or more components configured to receive external signals. An underground/embedded cable 108 may be used to transfer data relating to user information, weather or information about nearby bollards. This cable may also transfer power to the system or power may be transferred by a separate cable. A wireless receiving apparatus 107 may be used instead of, or in combination with an underground/embedded cable to receive data. The wireless data may be in the form of Bluetooth®, Wi-Fi, NFC (near-field communication) or RFID (Radio-Frequency Identification Signals). The wireless data may be provided by an internet server. This wireless receiving apparatus may also receive power that is then transferred to the system or these functions may be performed by two separate receivers. The wireless receiving apparatus may be located on the charging or base portion or on the retraction mechanism. A user interface 109 may also be used to provide and/or receive information to or from a user. The user interface may comprise one or more of: a touchscreen, a keypad/keyboard, a display, one or more LEDs. Other external signals may be able to interface with the user interface 109. Such external signals could, for example, be generated in response to the scanning of a 1D, 2D or 3D barcode (such as visual ID 111), situated on the charging station. The user interface 109 may provide the user with information regarding the status of the vehicle (e.g. charge level, remaining charge time, time since connection, cost of charging) and/or the status of the charging system (e.g. whether the system is operating optimally or is damaged in any way, whether it is due for maintenance).

In one embodiment, the controller causes the retraction mechanism to retract the charging portion if the controller determines that a predetermined period of time has elapsed since the most recent electrical supply. Though a user will typically have control over the extension and retraction, it is advantageous to also have an automated or semi-automated means for retracting the charging portion, for example, if the user forgets to retract the charging portion after use, if the system is finished charging or damaged, or simply to not require a user command. The period of time after which retraction takes place may be set at a fixed value but may alternatively be defined in dependence on a number of factors, which may be used individually or in combination to define the period of time. Examples of such factors are:

The previous behaviour of a user, which may have been recorded previously and the data committed to memory. Such data be derived from just one user or be defined in dependence on the behaviour of a large number of users. Such data could constitute, for example, the average time between vehicle disconnection and the connection of a subsequent vehicle.

A user input, which the user may input on each use, or just once upon their first use. If a user knows he is likely to forget to retract the charging portion they may set it to retract after a shorter time period since disconnection, for example, whilst a user who wants to charge multiple vehicles (and thus must swap between them) may set it to retract after a longer time period since disconnection. Such an input could be provided directly to a user interface on the charging station, programmed into the system during installation or provided wirelessly via Bluetooth®, Wi-Fi, NFC (near-field communication) or RFID. The input may be provided via an internet server. Such a wireless signal could be sent from the vehicle, or a smart phone, smart watch or similar device. The input could also be generated in response to the scanning of a 1D, 2D or 3D barcode, situated on the charging station.

User proximity, as determined by one of the above mentioned wireless signals. It is known in the art to determine the proximity between a transmitter and receiver by various methods, such as measuring signal strength or using time of flight measurements. For example, whilst the user remains close, the charging portion may not retract after a longer period of time since disconnection time but if the user becomes distant the charging portion may retract after a shorter period of time since disconnection.

The charge level of a previously connected vehicle. For example, if the last vehicle to be connected to the system was fully charged, the charging portion may retract after a shorter period of time since disconnection than if the last connected vehicle was only half charged.

Signals received from nearby charging stations. Nearby charging stations may indicate, for example, whether they are in use, available, damaged, retracted or extended. It may be advantageous for a station to remain in an extended state longer if nearby stations are damaged, so as to advertise its availability and functionality, or, if vandalism is prevalent in the area, the charging portion may retract after a shorter period of time since disconnection.

The time of day. For example, the charging portion may be caused to retract after a shorter period of time at night due to a heightened risk of vandalism or risk of collisions with vehicles or pedestrians. The charging portion could be caused to retract after a shorter period of time in the day for aesthetic reasons.

The weather. If the weather is poor, for example, there is heavy rain or extreme temperatures, it may be advantageous for the system to retract quicker than if the weather was good. This may help to protect the internal workings of the system from environmental damage.

These factors may influence the period of time before the charging portion retracts after charging has ceased, individually or in combination. If they are used in combination, some factors may be given a higher weight or may even fully override other factors, for example, if the weather is deemed too hot for safe operation this may override the user's input preferred time.

Any of the factors listed above may also be arranged to cause the charging portion to retract immediately after charging has ceased, i.e. a period of time before retraction equal to zero seconds. Other factors, particularly those which may impact the safety of a user, such as the detection of a surge in power supplied to the charging station, may cause the charging portion to terminate charging and/or retract immediately. In the case the case where wireless charging is occurring, the system may automatically terminate charging and retract the charging portion.

The wireless receiving apparatus mentioned above could also be used to control when the retraction mechanism extends the charging portion. If the presence of an RFID tag, which could be in the possession of a user, is detected it may cause the charging portion to be extended. Alternatively, an external device in the user's possession (a smart phone, smart watch, car computer system etc.) could be used to detect the presence of an RFID tag 110 inside the charging system, and send signals which cause the charging portion to be extended. The RFID tag may be located in the base portion 102 or wholly or partially within the charging portion 101. Similarly, a user could use a device to read a visual ID 111, such as a 1D, 2D or 3D barcode, situated on the charging station, which would cause the device to generate a signal which indicates that the charging portion should be extended.

Generally, the control of any of the components described above can be implemented in software, firmware, hardware (e.g., fixed logic circuitry), or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description, it will be evident to a person skilled in the art that various modifications may be made within the scope of the invention.

The invention claimed is:

1. A charging station for charging the battery of a vehicle, comprising:
    a base portion configured for mounting in a substructure;
    a charging portion having a charging outlet for connection to a vehicle; and
    a retraction mechanism for moving the charging portion between an extended position in which it extends out of the base portion and a retracted position in which it is retracted into the base portion; and
    a controller for controlling the retraction mechanism;
    the controller being configured to:
        where the charging portion is in the retracted position in the base portion, determine if movement of the charging portion from the retracted position into the extended position is obstructed, and to prevent operation of the retraction mechanism to prevent movement of the charging portion out of the retracted position if an obstruction is detected; and
        where the controller determines there is no obstruction to movement of the charging portion from the retracted position into the extended position, cause the retraction mechanism to move the charging portion from the retracted position in the base portion to the extended position extending out of the base portion for charging the battery of a vehicle;
        determine whether a predetermined period of time has elapsed since the most recent charging from the charging outlet ceased; and
        cause the retraction mechanism to move the charging portion from the extended position extending out of the base portion to the retracted position in the base portion if the predetermined period of time is determined to have elapsed since the most recent electrical supply from the charging outlet.

2. A charging station as claimed in claim 1, wherein at least one of the base portion and a distal end of the charging portion comprises a load sensor to detect a load, and the controller is configured to prevent the retraction mechanism from extending the charging portion from the retracted position in the base portion if the load sensor detects a load that exceeds a predetermined threshold for preventing damage from attempting to extend the charging portion from the retracted position when a person or vehicle is blocking the charging portion.

3. A charging station as claimed in claim 1, wherein the charging outlet includes one or more electrical sockets or plugs, and the charging portion in the extended position is laterally adjacent to the vehicle.

4. A charging station as claimed in claim 3, wherein the charging outlet includes more than one electrical socket or plug.

5. A charging station as claimed in claim 1, wherein the charging portion comprises a telescopic column of telescopic segments, wherein the telescopic column is disposed within the base portion when the charging portion is in the retracted position, and wherein each telescopic segment extends out of the base portion when the charging portion is in the extended position.

6. A charging station as claimed in claim 5, wherein there are two to six telescopic segments in the telescopic column.

7. A charging station as claimed in claim 5, wherein there are exactly two or exactly three telescopic segments in the telescopic column.

8. A charging station as claimed in claim 1, wherein the charging outlet includes one or more wireless charging systems.

9. A charging station as claimed in claim 1, wherein the controller is further configured to adjust the predetermined period of time in dependence on one or both of the time of day and the weather.

10. A charging station as claimed in claim 1, wherein more than one retraction mechanism is provided for moving the charging portion.

11. A charging station as claimed in claim 1, wherein an RFID tag is provided, the charging station further comprises a receiving apparatus for receiving wireless signals, and the controller is configured to extend the charging portion from the retracted position to the extended position when the RFID tag is detected.

12. A charging station as claimed in claim 1, wherein an RFID tag is provided inside the charging station, and an external device in the user's possession, such as one of a smart phone, a smart watch and a car computer system, is used to detect the presence of the RFID tag and send one or more signals which cause the charging portion to be extended from the retracted position to the extended position.

13. A charging station as claimed in claim 1, wherein the charging station further comprises a data input cable, and wherein the controller is configured to extend or retract the charging portion in dependence on data received via the data input cable.

14. A charging station as claimed in claim 1, wherein the retraction mechanism is configured to move the charging portion substantially vertically between the extended position to provide the charging portion raised above a surface of the substructure and the retracted position below the surface of the substructure, when the charging station is mounted in the substructure.

15. A charging station as claimed in claim 1, wherein the base portion further comprises an anchoring portion for securing the base portion to the substructure, wherein the anchoring portion includes any one or more of concrete foundations, steel rods, bolts, welding, riveting, cementing, gluing, clipping.

16. A charging station as claimed in claim 1, wherein the controller is configured to control the retraction mechanism to drive the charging portion between the extended position and the retracted position in response to at least one of:
    actuation by a user of a physical user input device associated with the charging station, such as a push button or touch screen; and
    receipt of a signal from a mobile phone application or an in-car system.

17. A charging station as claimed in claim 1, wherein the controller is configured to control the retraction mechanism to drive the charging portion between the extended position and the retracted position in response to detection of a vehicle near, or no longer near, the charging station that can be charged by the charging station.

18. A charging station as claimed in claim 17, wherein the vehicle is an electrical vehicle which automatically communicates with the charging station.

19. A charging station as claimed in claim 1, wherein the charging station further comprises a user interface configured to receive an input from a user and the controller is further configured to adjust the predetermined period of time in dependence on the received input, wherein a 1D, 2D or 3D barcode is situated on the charging station, and in use using a device to scan or read said barcode generates a signal which interfaces with the user interface to provide a user with information regarding vehicle status such as any one or more of: charge level, remaining charge time, time since connection, cost of charging, and status of the charging system such as whether the system is operating optimally or is damaged in any way, or whether it is due for maintenance.

20. A charging station as claimed in claim 1, wherein a 1D, 2D or 3D barcode is situated on the charging station, and in use using a device to scan or read said barcode generates a signal which causes the charging portion to be extended.

* * * * *